July 12, 1932.  H. F. SMITH  1,866,825
REFRIGERATING APPARATUS
Filed Sept. 30, 1930
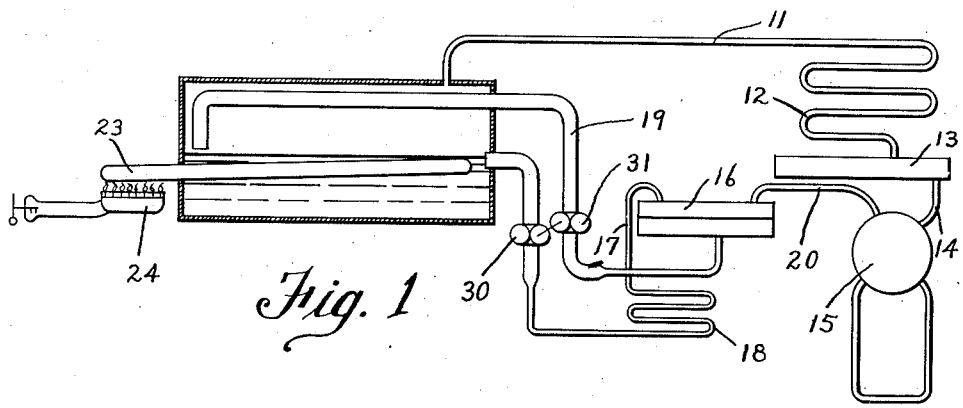
Fig. 1
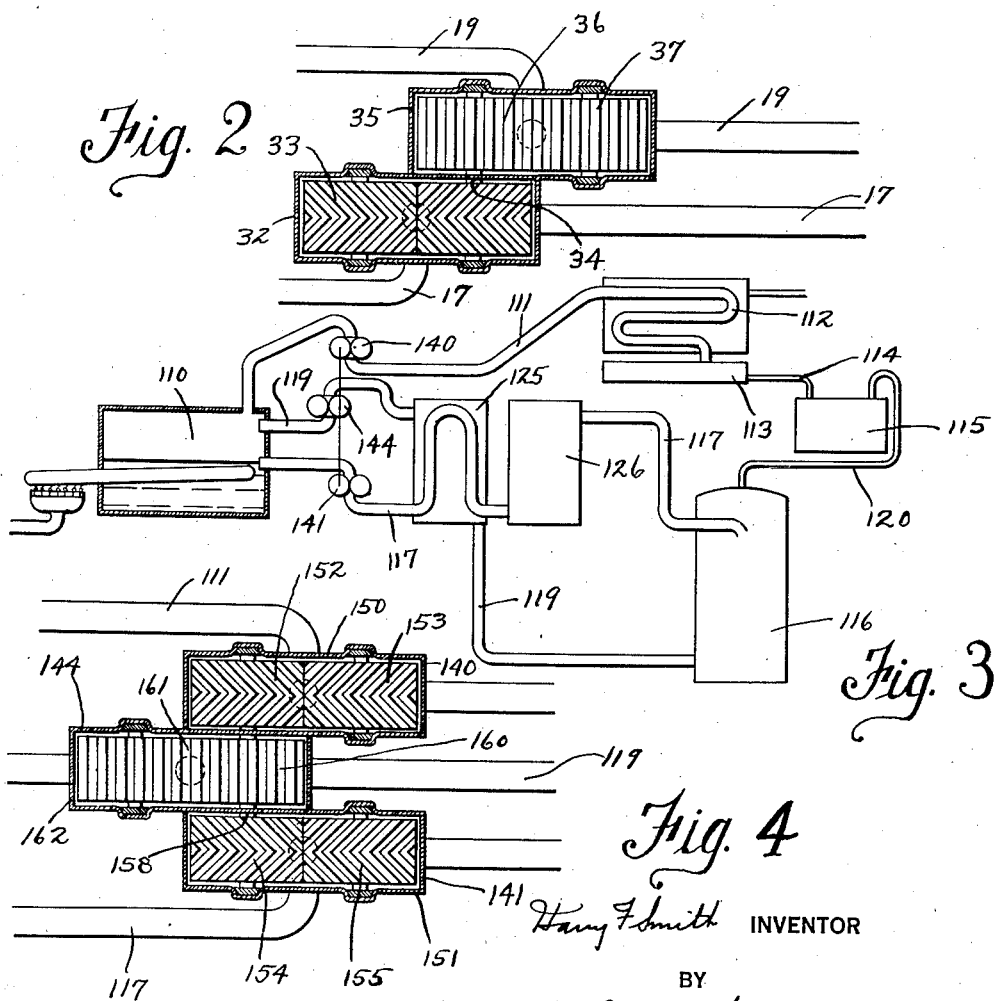
Fig. 2
Fig. 3
Fig. 4
Harry F Smith INVENTOR
BY
Spencer Hardman & Fike ATTORNEYS Patented July 12, 1932

1,866,825

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed September 30, 1930. Serial No. 485,429.

This invention relates to refrigerating apparatus and more particularly to refrigerating apparatus of the absorption type.

Refrigerating apparatus of the absorption type, particularly the so-called continuously operating type, generally includes a generator, a condenser, an evaporator, and an absorber interconnected to form a closed system. In the operation of such a continuous system, the generator is charged with a liquid absorption material, such as water, having dissolved therein a quantity of refrigerant, such as ammonia, the solution of ammonia in water being known as absorption liquor. Heat is applied to the generator, causing a liberation of ammonia from its solvent water, the liberated vapors passing to the condenser wherein they are condensed, the liquefied refrigerant finally passing to the evaporator or cooling coil located within the compartment or room to be cooled. As the refrigerant is liberated from the liquor within the generator, the solution becomes weaker and the liquor, known as weak liquor, is conducted to the absorber to again become strong liquor by reabsorbing the vapors resulting from the vaporization of the liquid refrigerant in the evaporator. The generator and condenser are maintained at a high pressure corresponding to the condensation temperature necessary, while the evaporator and the absorber are maintained at low pressure corresponding to the temperature desired within the evaporator. This difference in pressure between the generator and condenser, on the one hand, and the evaporator and absorber, on the other hand, is generally maintained by means of pressure reducing valves. Due to the difference in pressure between the generator and the absorber, the weak liquor flows by gravity from the generator to the absorber. In order to make the system continuously operative, some means must be provided for forcing the strong liquor from the absorber, a place of low pressure, back into the generator, a place of high pressure.

It is to such apparatus for forcing the strong liquor from the absorber to the generator that my invention particularly relates, having for one of its objects to provide an absorption system of the continuously operating type wherein all the forces necessary to accomplish continuous operation of the apparatus are generated within the system itself. More particularly to provide an apparatus wherein the strong liquor is forced from the absorber to the generator by means of forces generated within the absorption system itself.

A further object of this invention is to provide a continuously operating absorption system wherein the expansion of the refrigerant passing from the generator to the condenser is utilized to force the strong liquor from the absorber to the generator.

A still further object of this invention is to provide an absorption system of the continuously operating type wherein the temperature of the weak liquor leaving the generator may be exchanged for the pressure and the volume of the strong liquor passing from the absorber to thereby force the strong liquor from the absorber to the generator to render the apparatus continuously operative without the use of externally driven pumps and the like.

A still further object of this invention is to provide an absorption system of the continuously operating type wherein both the expansion of the gas leaving the generator and the expansion of the weak liquor leaving the generator are utilized to force the strong liquor from the absorber to the generator. More particularly to provide a device comprising a unitary structure including two expansion cylinders and a pumping cylinder for utilizing forces generated within the system itself for forcing strong liquor from the absorber to the generator.

Further objects and advantages of the present invention will be apparent from the following description, reference being had to the accompanying drawing, wherein a preferred form of the present invention is clearly shown.

In the drawing:

Fig. 1 is a diagrammatical view of an absorption system embodying features of this invention;

Fig. 2 is a view in section of the unitary expansion and pumping device;

Fig. 3 is a diagrammatical view of an absorption refrigerating system embodying features of this invention in a modified and preferred form; and Fig. 4 is a view in section of a unitary pumping and expansion device used in connection with the system disclosed in Fig. 3.

In order to illustrate the features of my invention, I have disclosed a refrigerating system of the so-called continuously operating absorption type. For instance, I have shown a generator generally indicated by the reference character 10, connected through a conduit 11 to a condenser 12, which in turn has its discharge end connected to a liquid receiver indicated at 13. The liquid receiver 13 is connected by means of the conduit 14 to the evaporator 15, which it should be understood is located within the compartment or cabinet to be cooled. The absorber 16 has its upper end connected by means of the conduit 17 to the generator-absorber 10, the conduit 17 including a cooling coil 18 for a purpose to be hereinafter fully set forth. The absorber 16 has its lower end connected by means of the conduit 19 to the generator-absorber 10 and has its upper end connected to the evaporator 15 through the conduit 20. Means are provided for heating the generator, shown in this modification as including a plurality of closed tubes 23, slightly inclined, and having their lower ends located above the burner 24. The tubes 23 contain a volatile liquid which, due to the inclination of the tubes 23, collects near the lower or left hand ends. When heat is applied through the burner 24, the volatile liquid within the lower ends of the tubes 23 vaporizes and, the vapors, passing upwardly within the tubes 23, condense at the upper ends thereof, to thereby give up their heat of condensation to the contents of the generator 10.

In operation, heat is applied to the generator 10 causing the ammonia held in solution therein to be liberated, the liberated ammonia passing through the conduit 11 into the condenser 12 to be condensed and collected in the liquid receiver 13. From the liquid receiver 13, the liquefied gas passes through the conduit 14 into the evaporator 15. Weak liquor from the generator 10 flows through the conduit 17, being cooled in the cooler 18, into the absorber 16, where the weak liquor comes in contact with the refrigerant vapors passing into the absorber 16 from the evaporator 15 through the conduit 20. Here the vapors are absorbed by the weak liquor to produce a strong liquor.

In order to render the apparatus continuously operative, some means must be provided for forcing the strong liquor from the absorber 16 back through the conduit 19 into the generator 10. To provide such forced circulation, I have shown diagrammatically in Fig. 1 an expansion engine 30 operatively connected to a pump 31. In Fig. 2, I have shown this expansion and pumping unit as a unitary device comprising a casing 32 housing the two helical gears 33, one of which gears is secured to a shaft 34 passing through the casing 32 into a casing 35 housing the gears 36 and 37 of the pump 31. The gear 36 is also secured to the shaft 34. In the operation of this pumping-expansion device, the weak liquor or a mixture of weak liquor and gas, flows from the generator 10, through the conduit 17, and enters the casing 32 to be expanded in the expansion engine, passing in expanded form into the absorber 16. In the expansion device the hot weak liquor from the generator gives up its potential energy due to its heat and pressure to drive the gear 36 of the pumping device 31, thereby forcing the strong liquor from the absorber 16 through the conduit 19 into the generator 10. It should be understood that the helical gears of the expansion motor are so proportioned to the inlet for the weak liquor that each chamber between the teeth, is only partly filled with weak liquor. As the gears rotate, thereby cutting each chamber successively out of communication with the generator 10, vapor is released from the weak liquor to occupy the excess space. The expansion of this vapor from generator pressure down to absorber pressure in its passage through the expansion motor produces power which is transmitted to the pumping gear 36 through the shaft 34. Thus the hot, high pressure gas is cooled and reduced in pressure and the heat and pressure withdrawn therefrom, are transferred into energy necessary to force the strong liquor from the absorber to the generator.

In Figs. 3 and 4 I have disclosed a modified and preferred form of refrigerating system, including the generator 110 connected through the conduit 111 to the condenser 112, which is in turn connected to discharge into the receiver 113. The receiver 113 is connected through a conduit 114 to the evaporator 115, which is likewise connected to the top of the absorber 116 by means of a conduit 120. The generator-absorber 110 is connected at its upper end through a conduit 119 to the lower end of the absorber 116, while at a lower point, the generator 110 is connected to the upper end of the absorber 116 through the conduit 117. The conduits 119 and 117 are arranged to form the heat exchange device 125, and in addition, the conduit 117 is provided with a cooler 126 corresponding in effect to the cooling coil 18 disclosed in Fig. 1.

The device disclosed in Fig. 3 operates in substantially the same manner as that disclosed in Fig. 1, the ammonia separated by the application of the heat to the generator 110 passes upwardly through the conduit 111 and is condensed in condenser 112 and collected in the receiver 113.

From the receiver 113, the liquid refrigerant flows to the evaporator 115 wherein it evaporates, and from where the vapors pass through the conduit 120 to be absorbed in the weak liquor within the absorber 116. The weak liquor from the generator 110 flows to the absorber 116 through the conduit 117 including the heat exchange device 125 and the cooling coil 126, while the strong liquor from the absorber 116 flows back to the generator 110 through the conduit 119.

In order to render the apparatus continuously operative, means are also provided in the apparatus disclosed in Fig. 3 for forcing the strong liquor from the absorber 116 to the generator 110. In this modification I have shown diagrammatically an expansion engine 140 located in the conduit 111, and an expansion engine 141 connected in the conduit 117, both expansion engines being connected to drive a pump 144 located within the conduit 119. In Fig. 4 this combined expansion and pumping mechanism is shown in the form of a unitary structure wherein the casings 150 and 151 house respectively the gears 152, 153, 154, and 155. The gears 152 and 154 are directly connected to a shaft 158, which shaft is also connected directly to the gear 160 of the pump 161 located within the casing 162.

In the operation of the device disclosed in Fig. 4, the refrigerant liberated from the absorption liquor by the application of heat to the generator 110 passes through the conduit 111 and expands through the expansion engine 150. At the same time the weak liquor leaving the generator 110 passes through and is expanded into the expansion engine 151. As previously stated, the expansion engines 150 and 151 are directly connected to the pump 161 and consequently the work done by the expanding of the fluids within the engines is utilized to drive the pump 161 thereby forcing the strong liquor from the absorber 16 back into the generator 10.

It should be understood that the apparatus disclosed in Figs. 3 and 4 is constructed similar to the apparatus disclosed in Figs. 1 and 2. For instance, the helical gears 152 and 153 of the expansion engine 140 are so proportioned relative to the conduit 111 that each space between the teeth of the gears will receive less refrigerant gas than is required to fill the entire space. As the gears rotate and the space between the teeth is cut out of communication with the generator 10, the refrigerant gas will expand to occupy the entire space and in thus expanding will do work on the gear 160 of the pump 144 through the connecting shaft 158. In the same manner the gears 154 and 155 of the expansion motor 141 are likewise proportioned relative to the conduit 117 that the amount of weak liquor received in the spaces between the teeth of the gears will be insufficient to completely fill such spaces. Consequently, upon rotation of the gears 154 and 155 the spaces between the teeth of the gears will be cut out of communication with the generator 110 and the refrigerant vapors will be released from the weak liquor to fill the spaces. This expansion will also do work on the gear 160 of the pump 144 through the interconnecting shaft 158. It should be noted also that the unitary expansion engine and pumping mechanism disclosed in Figs. 2 and 4 are constructed as a unitary device thereby eliminating the necessity of packing glands and the like.

While throughout the specification it has been repeatedly stated that the refrigerant is ammonia and the absorption liquor is water, it may be advisable to use some material for the absorption fluid which will act as a lubricant for the gears in passing therethrough. For instance, sulphur dioxide could be used as a refrigerant and various oils capable of absorbing sulphur dioxide could be used as the absorption material. By using oil as an absorbent, many of the objections to moving parts in a system of this type could be eliminated for the reason that such parts would always be thoroughly lubricated by the absorption liquid itself. However, it has been found that gears of the type described herein may be operated with the ordinary ammonia and water system efficiently.

Thus in Figs. 1 and 2 I have disclosed an apparatus utilizing merely the forces inherent in the weak liquor leaving the generator for the rendering the apparatus continuously operative while in Figs. 3 and 4 I have disclosed an apparatus dependent, not only upon the energy inherent in the weak liquor leaving the generator, but also upon the energy contained within the refrigerant leaving the generator on its way to the condenser, for rendering the apparatus continuously operative. Thus I have provided an absorption refrigerating apparatus requiring no externally operating moving parts and which is made continuously operative by the application of heat to one point in the system alone.

While the form of embodiment of the invention as herein disclosed, constitutes a preferred form, it is to be understood that other forms might be adopted, all coming within the scope of the claims which follow.

What is claimed is as follows:

1. In the art of refrigeration through the agency of an absorption system wherein a refrigerant is separated from a liquid absorbent in a generator, condensed in a condenser, evaporated in an evaporator, and absorbed in an absorber, that step comprising, circulating the strong liquor from the absorber to the generator by forces generated by the flow of refrigerant from the generator to the condenser and by the flow of weak liquor from the generator to the absorber.

2. The method of refrigeration which comprises separating a refrigerant gas from its absorption liquor in a generator, condensing the separated gas, evaporating the liquefied gas, circulating the weak liquor from the generator to the absorber, absorbing the vaporized refrigerant in the weak liquor, expanding the gas passing from the generator to the condenser, expanding the hot weak liquor leaving the generator, and utilizing the energy derived from said expansions to force the strong liquor from the absorber to the generator.

3. Refrigerating apparatus comprising a generator, a condenser, an evaporator, an absorber, a connection between said generator and said condenser, an expansion engine in said connection, a second connection between said generator and said absorber, a second expansion engine in said second-named connection, and means driven by said expansion engines for forcing strong liquor from the absorber to the generator.

4. Refrigerating apparatus comprising a generator, a condenser, an absorber, an evaporator, a connection between said generator and said condenser, an expansion engine in said connection, a connection for conducting weak liquor from the generator to the absorber, a second expansion engine in said second-named connection and a single pump driven by said expansion engine for forcing strong liquor from the absorber to the generator.

5. Refrigerating apparatus comprising a first circuit for fluid including a generator, a condenser, an evaporator, and an absorber, a second circuit for absorption liquor including said generator and said absorber, and means dependent upon the flow of absorption liquor in one direction through said second-named circuit and upon the flow of fluid through said first-named circuit for circulating strong liquor in the other direction within said second-named circuit.

6. Refrigerating apparatus comprising a first circuit for fluid including a generator, a condenser, an evaporator, and an absorber, a second circuit for absorption liquor including said generator and said absorber, and a single means dependent upon the flow of absorption liquor in one direction through said second-named circuit, and upon the flow of fluid through said first-named circuit for circulating strong liquor in the other direction within said second-named circuit.

In testimony whereof I hereto affix my signature.

HARRY F. SMITH.